(12) United States Patent
Udani et al.

(10) Patent No.: US 8,356,110 B2
(45) Date of Patent: Jan. 15, 2013

(54) ADAPTIVE BANDWIDTH RESOURCE MANAGEMENT FOR MEDIA STREAMS

(75) Inventors: Sanjay K. Udani, Arlington, VA (US); Naseem Khan, Oak Hill, VA (US); Eric R. Sporel, Westford, MA (US); Tim Dwight, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 328 days.

(21) Appl. No.: 12/862,817

(22) Filed: Aug. 25, 2010

(65) Prior Publication Data

US 2012/0054344 A1 Mar. 1, 2012

(51) Int. Cl.
*G06F 15/16* (2006.01)
*G06F 11/00* (2006.01)
(52) U.S. Cl. ......... 709/231; 709/232; 709/233; 370/235
(58) Field of Classification Search .................. 709/231, 709/232, 233; 375/235
See application file for complete search history.

(56) References Cited

U.S. PATENT DOCUMENTS

2009/0109849 A1* 4/2009 Wood et al. .................. 370/235
2009/0150943 A1* 6/2009 Vasudevan et al. ............. 725/86

* cited by examiner

*Primary Examiner* — Ashgar Bilgrami

(57) ABSTRACT

A resource manager permits a first user to use a first bandwidth of a shared pool of bandwidth for receiving a first media stream, where the shared pool of bandwidth comprises a maximum amount of available bandwidth. The resource manager receives a request from a second user to use a second bandwidth of the shared pool of bandwidth for receiving a second media stream, and determines whether it is permissible to decrease the quality of the first media stream or the second media stream to reduce the first bandwidth or the second bandwidth such that the second bandwidth combined with the first bandwidth does not exceed the maximum amount of available bandwidth of the pool of bandwidth, where determining whether it is permissible to decrease the quality of the first media stream or the second media stream includes one of: signaling the first user to determine if the first user approves decreasing the quality of the first media stream, or signaling the second user to determine if the second user approves decreasing the quality of the second media stream. The resource manager further decreases the quality of the first media stream or the second media stream based on the permissibility determination.

21 Claims, 12 Drawing Sheets

ADAPTIVE BANDWIDTH RESOURCE MANAGEMENT FOR MEDIA STREAMS

BACKGROUND

Typically, network subscribers, such as, for example, subscribers to residential or commercial broadband network service, have multiple clients connected to a single network service "pipe" that provides the broadband service to the multiple clients. The service "pipe" (e.g., an Internet Protocol "pipe") may, therefore, represent a "resource pool" from which the multiple clients must share the available resources on the "pipe" when receiving network services (e.g., media delivery) via the "pipe." For example, when the broadband network service is provided via a cable network (e.g., an optical fiber cable network), each service "pipe" to a residential or commercial site may have a maximum bandwidth that can be used to carry traffic over the service "pipe." Therefore, the amount of traffic that can be delivered to the multiple clients simultaneously via the service "pipe" is limited by the maximum bandwidth capacity, and every request for sharing of the bandwidth of the service "pipe" may not be able to be satisfied.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
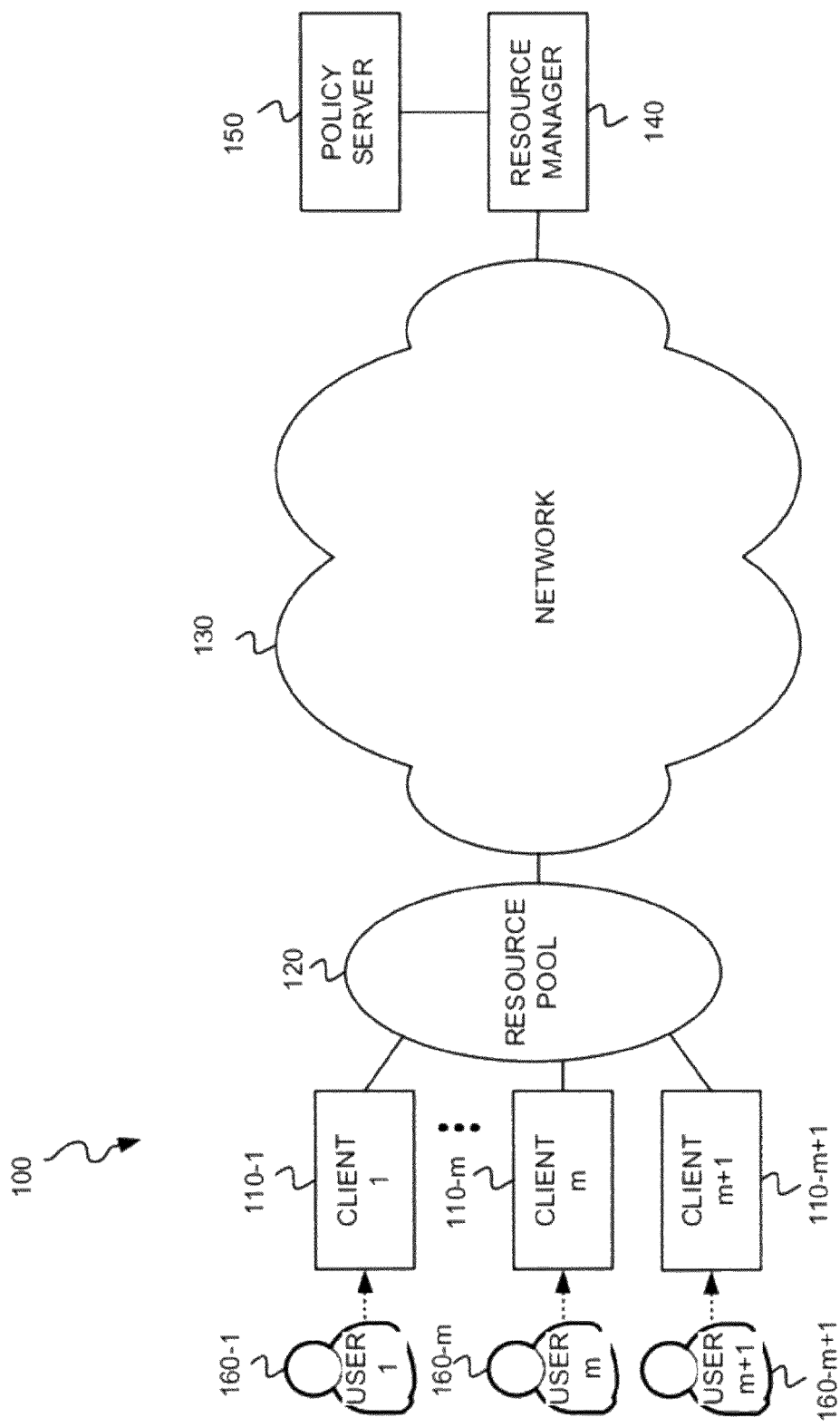
FIG. 1 is a diagram that depicts an exemplary environment in which a resource pool, that is shared by multiple users, may be adaptively managed.

FIG. 1 is a diagram that depicts an exemplary environment 100 in which a resource pool, that is shared by multiple users, may be adaptively managed. Environment 100 may include multiple clients 110-1 through 110-$m$+1, a resource pool 120, a network 130, a resource manager 140, and a policy server 150. Each of users 160-1 through 160-$m$+1 may be associated with a respective one of clients 110-1 through 110-$m$+1.

Each of clients 110-1 through 110-$m$+1 may include a device, or a combination of devices, that uses resources of resource pool 120. In one exemplary implementation, each of clients 110-1 through 110-$m$+1 may include a set-top box (STB) that receives media streams (e.g., video streams) via resource pool 120 from network 130, where resource pool 120 may include a pool of bandwidth shared between all of clients 110-1 through 110-$m$+1.

Resource pool 120 may include a pool of network resources shared by clients 110-1 through 110-$m$+1. In one exemplary implementation, resource pool 120 may include a pool of bandwidth shared between all of clients 110-1 through 110-$m$ for receiving media delivery from network 130. For example, resource pool 120 may include a broadband Internet Protocol (IP) pipe dedicated to a residential or commercial subscriber of a broadband network service. In such a case, resource pool 120 may have a pre-defined, limited amount of available bandwidth that may be shared between users 160-1 through 160-$m$+1 associated with clients 110-1 through 110-$m$+1. The broadband network service may supply the pre-defined, limited amount of available bandwidth to clients 110-1 through 110-$m$+1 via, for example, a cable network (e.g., an optical fiber cable network). In another exemplary implementation, resource pool 120 may include an access circuit to a public network that may be shared by users 160-1 through 160-$m$+1.

Network 130 may include one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Resource manager 140 may adaptively manage the use of resource pool 120 by users 160-1 through 160-$m$+1, as described in further detail herein. Policy server 150 may codify and store rules regarding how the resources of resource pool 120 may be shared between users 160-1 through 160-$m$+1. Resource manager 140 may consult with policy server 150 to determine applicable policy rules for sharing the resources of resource pool 120 between users $U_1$ to $U_{m+1}$.

Figure 2:
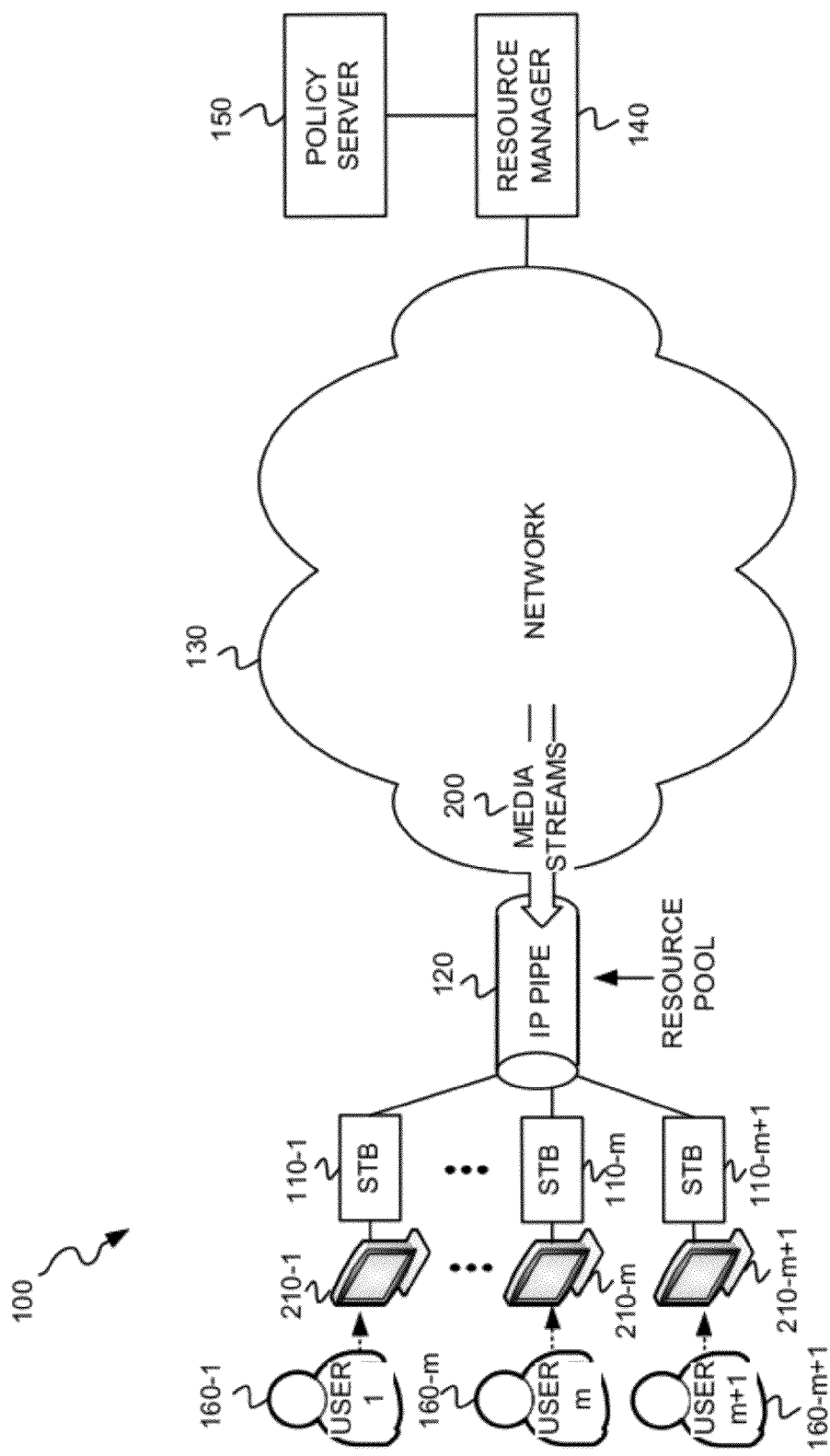
FIG. 2 is a diagram of one example of the environment of FIG. 1 in which the resource pool includes an Internet Protocol (IP) pipe for handling streams of media destined for one or more of multiple users.

FIG. 2 is a diagram of one example of environment 100 in which resource pool 120 includes an Internet Protocol (IP) pipe for handling streams of media destined for one or more of users 160-1 through 160-$m$+1. As shown in FIG. 2, each client 110-1 through 110-$m$+1 of FIG. 1 includes a set-top box (STB) connected to a respective television or monitor 210-1 through 210-$m$+1. Media streams 200 may be delivered, from network 130, via an IP pipe 120 to users 160-1 through 160-$m$+1. IP pipe 120 may include a broadband IP pipe dedicated to a residential or commercial subscriber of a broadband network service that offers a pool of bandwidth that can be shared between users 160-1 through 160-$m$+1. IP pipe 120 may have a pre-defined, limited amount of available bandwidth that may be shared between users 160-1 through 160-$m$ and 160-$m$+1 for receiving media streams 200. In some implementations, the limited amount of available bandwidth that may be shared between users 160-1 through 160-$m$ and 160-$m$+1 may be a subset of the overall IP pipe bandwidth. For example, IP pipe 120 may include an overall bandwidth of 100 Mbps, however, 20 Mbps of the 100 Mbps may be dedicated to prioritized traffic such as for example, prioritized media streams. In such implementations, the limited amount of bandwidth shared between the users may include only the 20 Mbps of bandwidth dedicated to prioritized traffic, and not the entire 100 Mbps of IP pipe 120. Resource manager 140, as described further herein, may adaptively manage the sharing of the bandwidth of IP pipe 120 by users 160-1 through 160-$m$+1.

Figure 3:
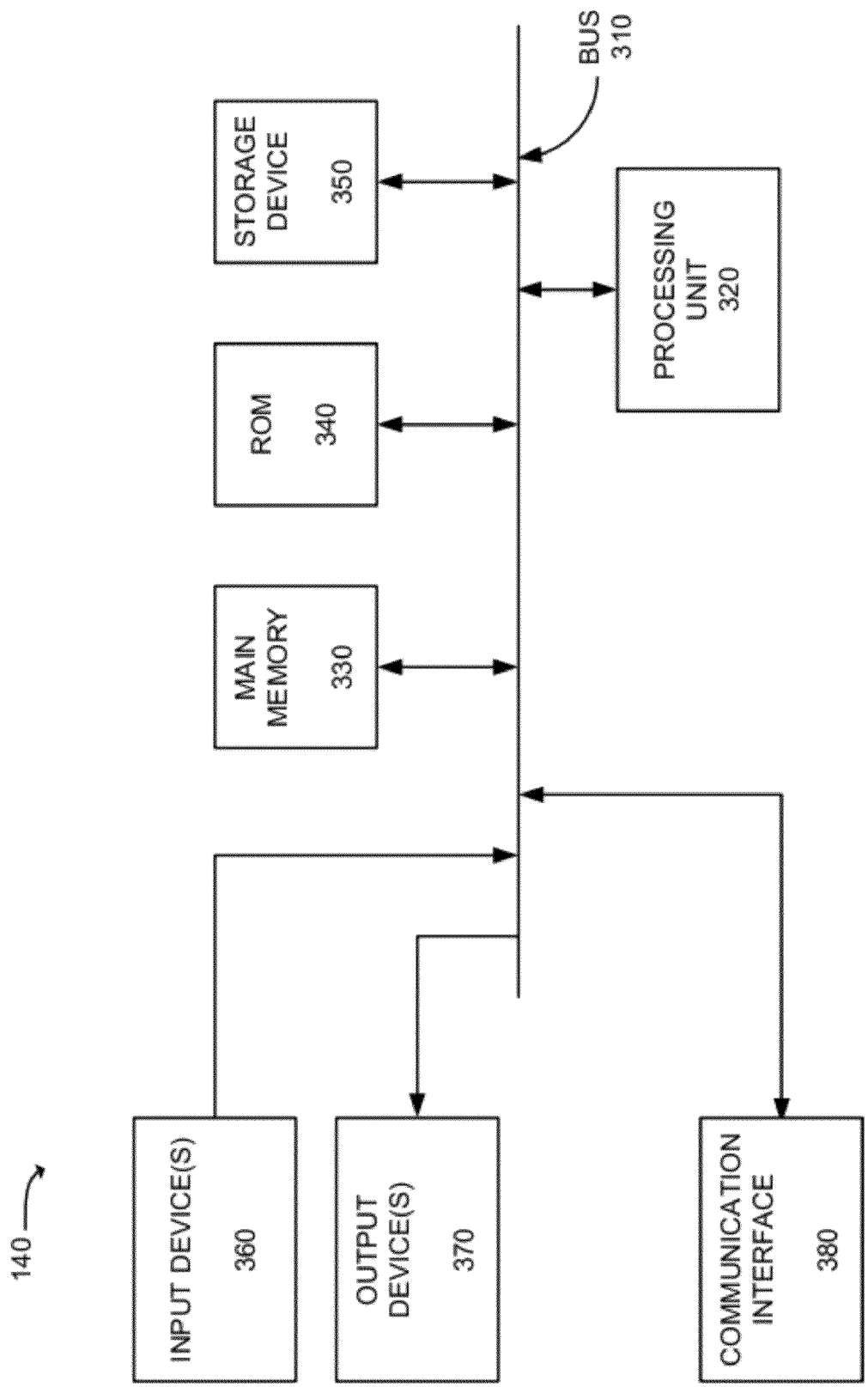
FIG. 3 is a diagram of exemplary components of the resource manager of FIG. 1.

FIG. 3 is a diagram of exemplary components of resource manager 140. Clients 110-1 through 110-$m$+1 and policy server 150 may be similarly configured. Resource manager 140 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of resource manager 140.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to resource manager 140, such as, for example, a keypad or a keyboard, voice recognition and/or biometric mechanisms, etc. Output device(s) 370 may include one or more mechanisms that output information to the operator, including a display, a speaker, etc. Communication interface 380 may include a transceiver mechanism that enables resource manager 140 to communicate with other devices and/or systems. For example, communication interface 380 may include mechanisms for communicating with another device or system via a network, such as communicating with clients 110-1 through 110-$m$+1 via network 130.

Resource manager 140 may perform certain operations or processes, or may implement certain functional modules, as may be described in detail below. Resource manager 140 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into main memory 330 from another computer-readable medium, such as storage device 350, or from another device via communication interface 380. The software instructions contained in main memory 330 may cause processing unit 320 to perform operations or processes, or to implement functional modules, that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of resource manager 140 illustrated in FIG. 3 is for illustrative purposes only. It should be understood that other configurations may be implemented. Therefore, resource manager 140 may include additional, fewer and/or different components than those depicted in FIG. 3.

Figure 4:
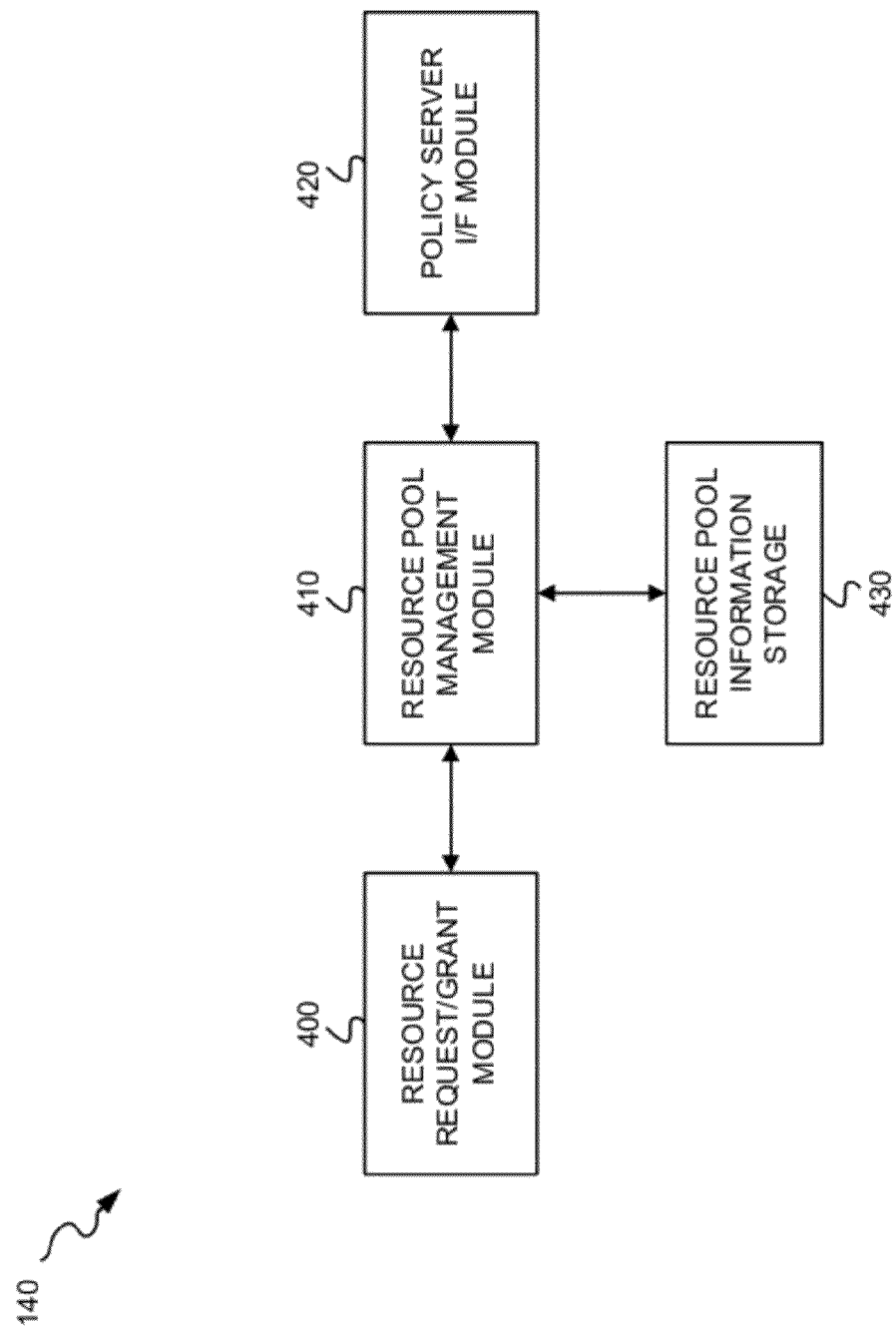
FIG. 4 is a diagram that depicts exemplary functional components of the resource manager of FIG. 1.

FIG. 4 is a diagram that depicts exemplary functional components (i.e., functional modules) of resource manager 140. Resource manager 140 may include a resource request/grant module 400, a resource pool management module 410, a policy server interface (I/F) module 420, and resource pool information storage 430.

Resource request/grant module 400 may receive requests to use certain amounts of resources from resource pool 120 from respective ones of clients 110-1 through 110-$m$+1. Resource request/grant module 400 may notify resource pool management module 410 of each request received from a user 160 via a respective client 110. Resource request/grant module 400 may further send a resource grant or a resource rejection message to the requesting client 110 based on notifications received from resource pool management module 410.

Resource pool management module 410 may process each resource request that it is notified of by resource request/grant module 400. Resource pool management module 410 may notify policy server I/F module 420 of each request, and may receive a corresponding notification back from module 420 subsequent to module 420 sending a policy request to policy server 150 and receiving a policy reply from policy server 150. Based on the notification received from module 420, and based on accessing relevant information related to sessions currently existing for users 160, resource pool management module 410 may determine the disposition of the resource request, as described in further detail below with respect to FIGS. 5A, 5B and 7.

Policy server I/F module 420 may send policy requests to policy server 150 based on notifications of resource requests received from resource pool management module 410. Module 420 may receive the policy replies from policy server 150 and may notify management module 410 of the content of the policy reply from policy server 150.

Resource pool information storage 430 may store information related to sessions that currently exist for respective ones of users 160-1 through 160-$m$+1. The stored information may include an identification of each client 110 currently involved in a session, the resources of resource pool 120 allocated to that session, and an identification of the type of session (e.g., high definition video, etc.) in which each client 110 is involved.

Figure 5A:
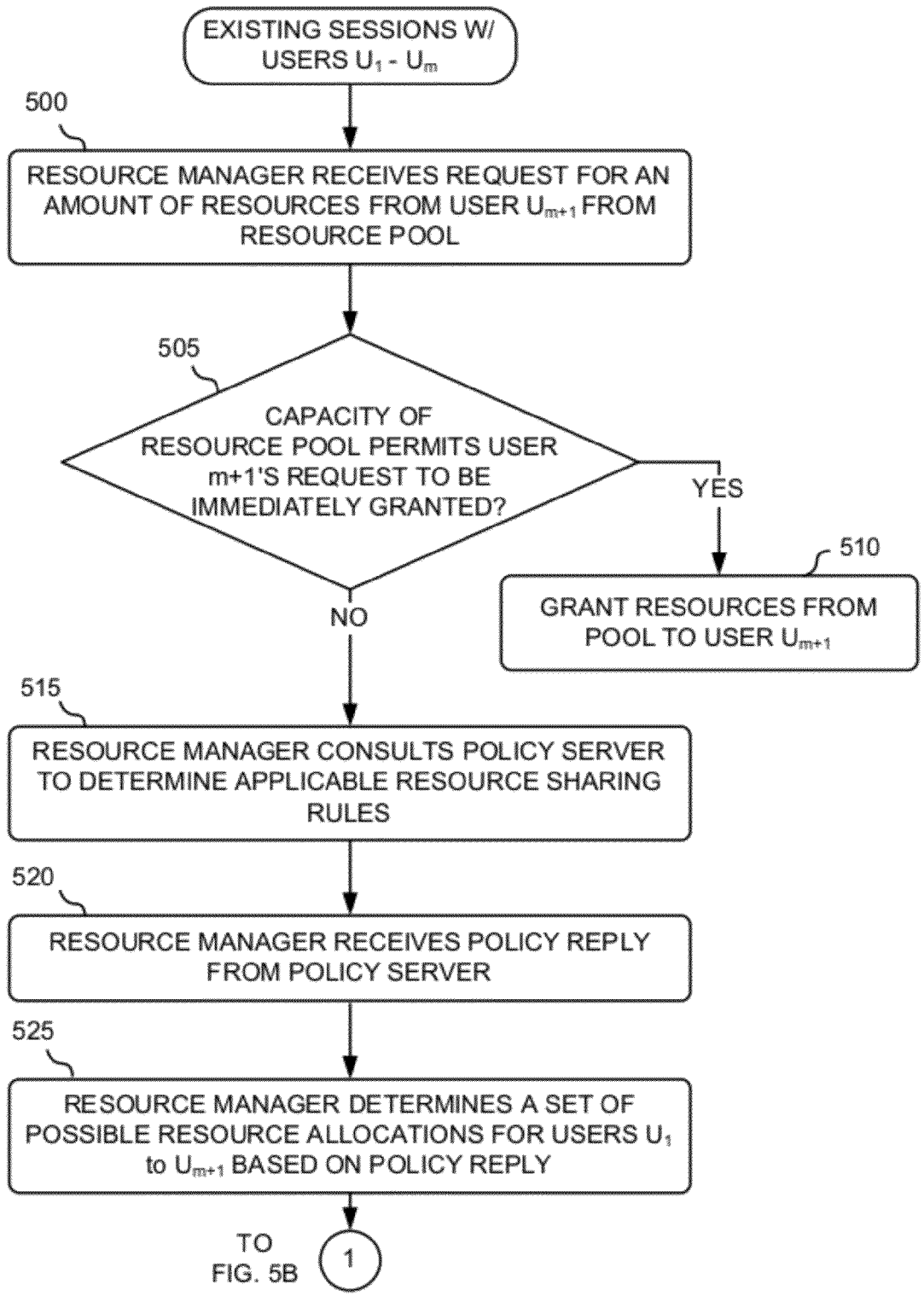
FIGS. 5A and 5B are flow diagrams illustrating an exemplary process for adaptively managing resources of a resource pool shared by multiple users.
Figure 5B:
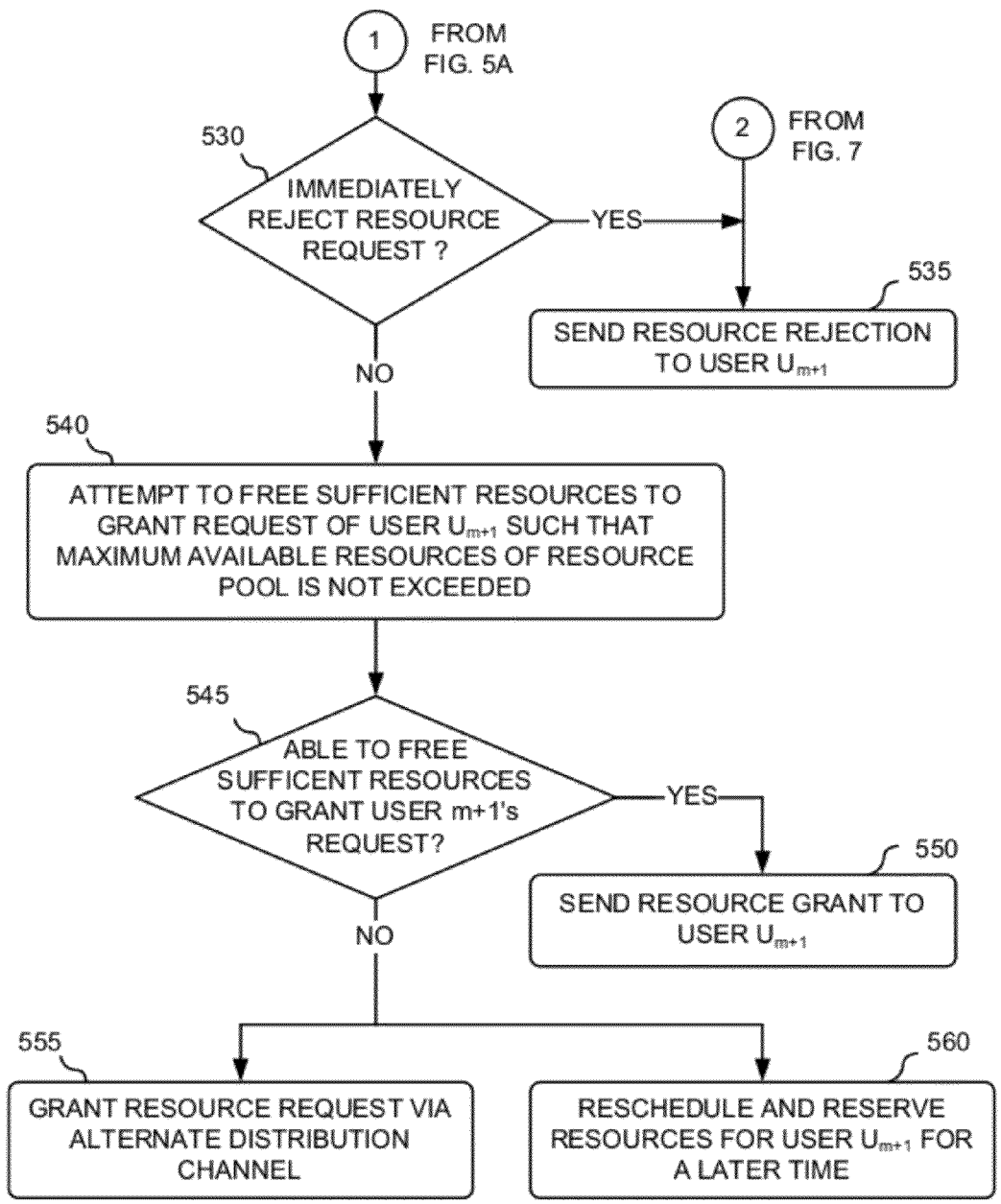
Figure 6:
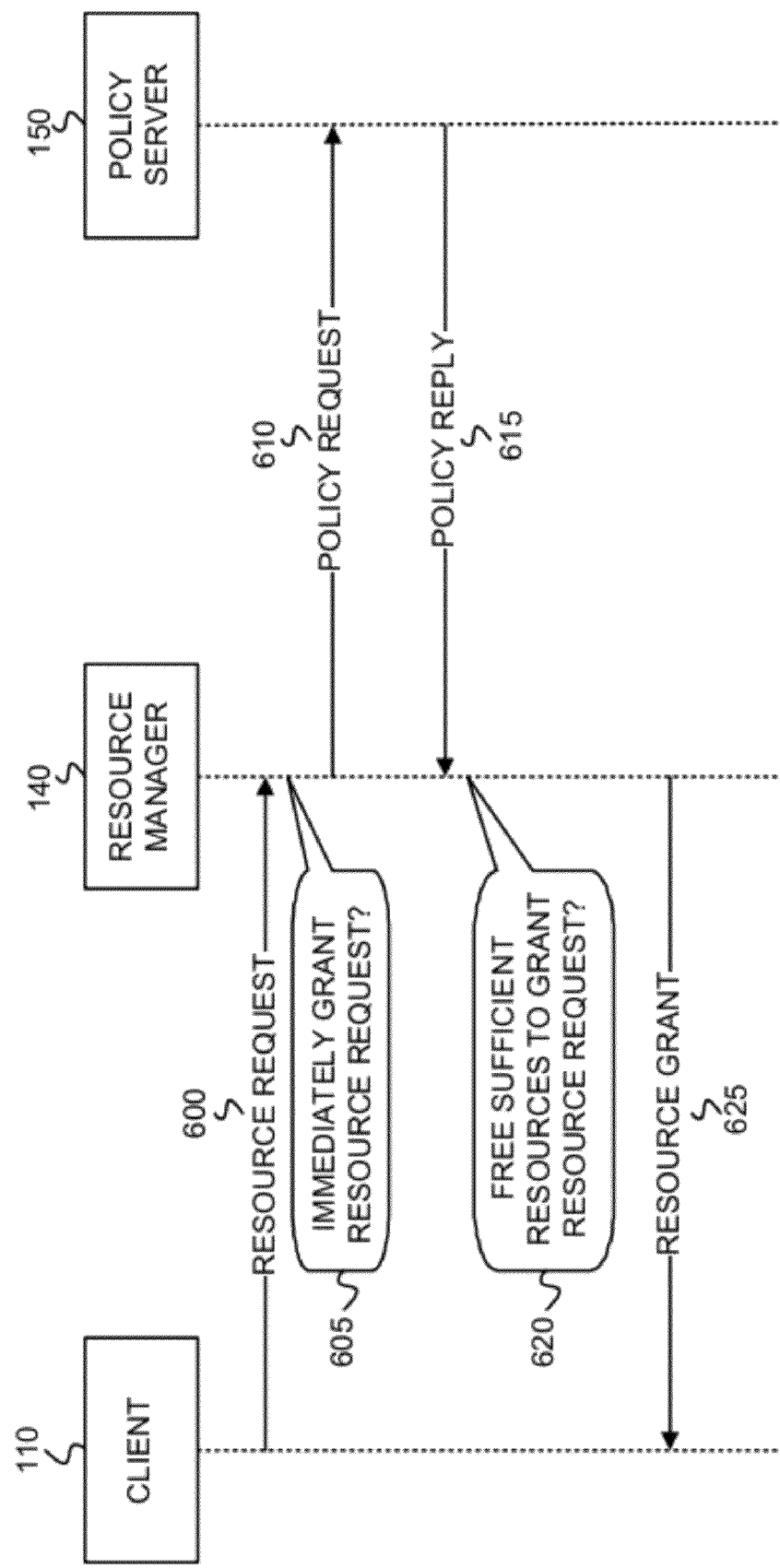
FIG. 6 is an exemplary messaging diagram associated with the exemplary process of FIGS. 5A and 5B.

FIGS. 5A and 5B are flow diagrams illustrating an exemplary process for adaptively managing resources of resource pool 120 shared by users 160-1 through 160-$m$+1. The exemplary process of FIGS. 5A & 5B may be implemented by various components of resource manager 140, as described further below. The exemplary process of FIGS. 5A and 5B assumes that there are existing media sessions involving users $U_1$ 160-1 through $U_m$ 160-$m$, where m is equal to, or greater than, 1. Therefore, at least one session involving a user 160 exists at the time a request for resources is received from another user at resource manager 140. The description of the exemplary process of FIGS. 5A and 5B below may refer to the exemplary messaging diagram of FIG. 6.

The exemplary process may include resource manager 140 receiving a request for an amount of resources from user $U_{m+1}$ from resource pool 120 (block 500). Resource request/grant module 400 of resource manager 140 may receive a resource request from user $U_{m+1}$ via client 110-$m$+1. Resource request/grant module 400 may send a notification of the resource request to resource pool management module 410. Referring to the exemplary messaging diagram of FIG. 6, client 110 (e.g., associated with user $U_{m+1}$) may send a resource request 600 to resource manager 140 via client 110-$m$+1. In an example of the exemplary environment 100 of FIG. 2, IP pipe 120 may carry a maximum bandwidth of 20 Mbps of traffic, and a session involving user $U_m$ 160-$m$ may already exist at the time that user $U_{m+1}$ sends a request for an amount of resources from resource pool 120. The session involving user $U_m$ 160-$m$ may include a high definition (HD) video session that requires 18 Mbps of the maximum 20 Mbps bandwidth of IP pipe 120. The resource request from user $U_{m+1}$ may involve a request to watch video on demand that requires 4 Mbps of bandwidth of IP pipe 120.

Resource manager 140 may determine if the capacity of resource pool 120 permits user $U_{m+1}$'s request to be immediately granted (block 505). Resource pool management module 410 may analyze the resource usage of all users having existing sessions to determine if there are sufficient resources left in resource pool 120 to enable an additional grant of resources from resource pool 120 to user $U_{m+1}$. Referring to the messaging diagram of FIG. 6, resource manager 140 may determine whether to immediately grant 605 the resource request 600 from client 110. In the example of the exemplary environment 100 of FIG. 2, since user $U_{m+1}$'s request for resources involves a request for video on demand that requires 4 Mbps of bandwidth, and since the existing session involving user $U_m$ 160-$m$ involves a high definition video session requiring 18 Mbps, the sum of 18 Mbps and 4 Mbps is greater than the 20 Mbps maximum bandwidth of IP pipe 120. Therefore, in this example, resource manager 140 may determine that the capacity of IP pipe does not permit user $U_{m+1}$'s request to be immediately granted.

If resource manager 140 determines that the capacity of resource pool 120 permits the request to be immediately granted (YES—block 505), then resource manager 140 may grant the requested resources from resource pool 120 to user $U_{m+1}$ (block 510). Resource request/grant module 400 may send a message to user $U_{m+1}$ granting the requested resources. If resource manager 140 determines that the capacity of resource pool 120 does not permit user $U_{m+1}$'s request to be immediately granted (NO—block 505), then resource manager 140 may consult with or access policy server 150 to determine the applicable resource sharing rules (block 515). Referring to the messaging diagram of FIG. 6, resource manager 140 may send a policy request 610 to policy server 150 that requests the applicable resource sharing rules. Policy server I/F module of resource manager 140 may send policy request 610 to policy server 150.

Resource manager 140 may receive a policy reply from policy server 150 (block 520). Referring to the messaging diagram of FIG. 6, resource manager 140 may receive a policy reply 615 back from policy server 150 in response to policy request 610. The policy reply from policy server 150 may specify the applicable rules for sharing existing resources of resource pool 120 between users $U_1$ through $U_{m+1}$. Resource manager 140 may determine a set of possible resource allocations for users $U_1$ to $U_{m+1}$ based on the applicable rules for sharing existing resources of resource pool 120 received in the policy reply from policy server 150 (block 525).

Various combinations of resource allocations may be available depending on the capabilities of one or more applications at respective clients 110-1 through 110-$m$+1. For example, clients 110-1, 110-2 and 110-3 may only include applications or processing capabilities for receiving and viewing standard definition video. However, clients 110-4 through 110-$m$+1 may include applications or processing capabilities for receiving and viewing standard and high definition video. Therefore, only low bandwidths need to be allocated to users at clients 110-1 through 110-3, whereas either low or high bandwidths may be allocated to users at clients 110-4 through 110-$m$+1. Various different combinations of resource allocations may, thus, be available in a set of possible resource allocations. For example, one combination of possible resource allocations may include the following: [STD, STD, STD, HD, HD, ..., STD], where "STD" represents standard definition video and "HD" represents high definition video, and the sequence of clients in the combination includes the following: [110-1, 110-2, 110-3, 110-4, 110-5, ..., 110-$m$+1]. Another combination of possible resource allocations may include the following: [STD, STD, STD, HD, STD, ..., STD].

Resource manager 140 may determine whether to immediately reject the resource request (block 530). Resource pool management module 410 may analyze the determined set of possible resource allocations for users $U_1$ to $U_{m+1}$, and determine that there is no current combination of possible resource allocations that would enable a grant of resources to user $U_{m+1}$. For example, all combinations of possible resource allocations may result in a resource usage that exceeds the available resources in resource pool 120. In the exemplary environment 100 of FIG. 2, for example, existing sessions with users $U_1$ through $U_m$ may already meet the maximum available bandwidth of IP pipe 120, and each of the existing sessions of users $U_1$ through $U_m$ may already be at the lowest quality and bandwidth available for the media session. Therefore, there is no possibility of decreasing resource usage of any of the existing sessions, and the resource request to user $U_{m+1}$ cannot be granted.

If it is determined that the resource request should be immediately rejected (YES—block 530), then resource manager 140 may send a resource rejection to user $U_{m+1}$ (block 535). If it is determined that the resource request should not immediately be rejected (NO—block 530), then resource manager 140 may attempt to free sufficient resources to grant the request of user $U_{m+1}$ such that the maximum available resources of the resource pool is not exceeded (block 540). Referring to the messaging diagram of FIG. 6, resource manager 140, after receiving policy reply 615 from policy server 150, may determine whether it can free 620 sufficient resources to grant user $U_{m+1}$'s resource request.

Figure 7:
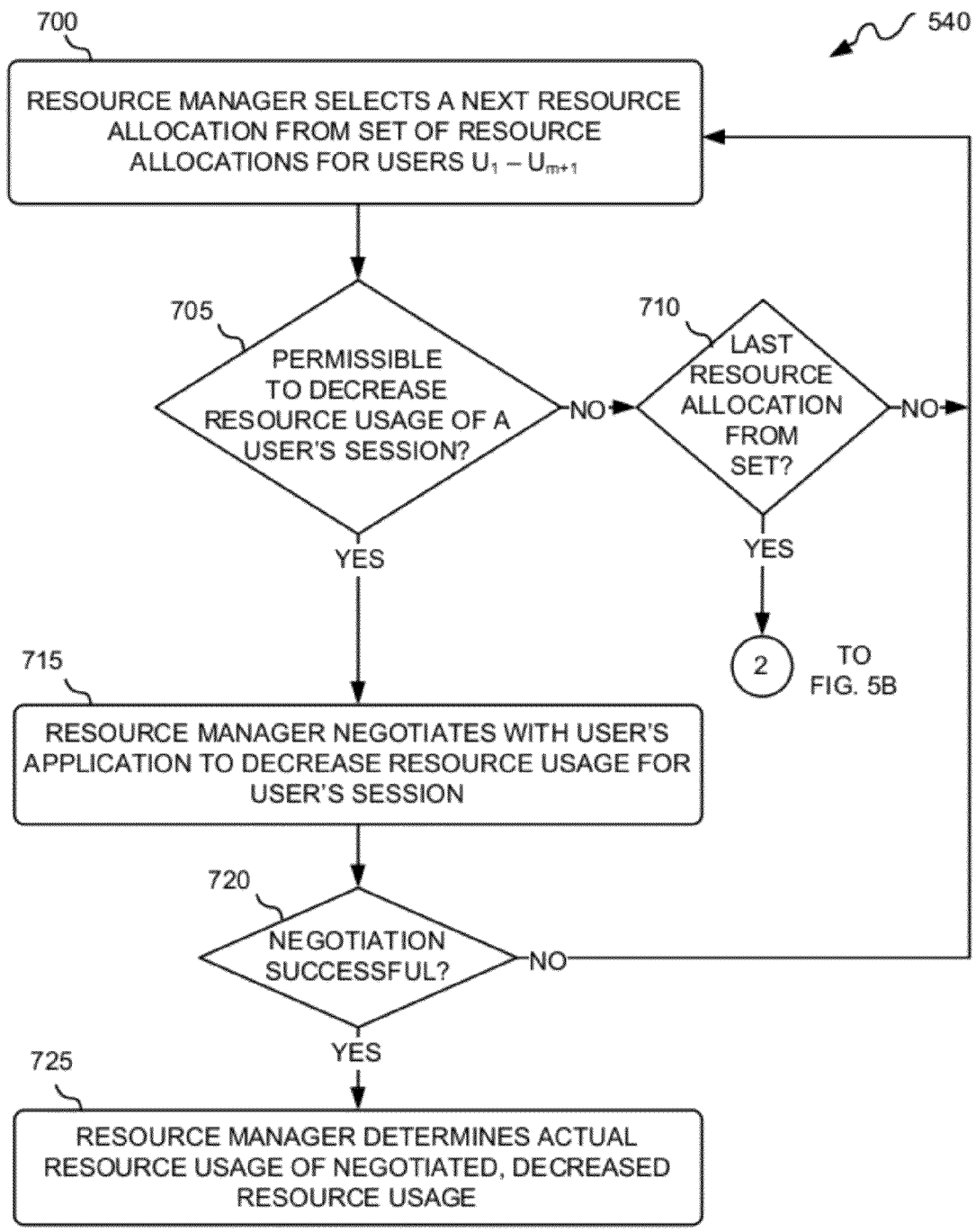
FIG. 7 illustrates a flow diagram that includes exemplary blocks that resource manager 140 may implement to attempt to free sufficient resources to grant a user's resource request such that the maximum available resources of a resource pool is not exceeded.

FIG. 7 illustrates a flow diagram that sets forth further exemplary details of block 540 of FIG. 5B (i.e., further details of how resource manager 140 attempts to free sufficient resources to the grant the request of user $U_{m+1}$ such that the maximum available resources of resource pool 120 are not exceeded). To attempt to free resources, resource manager 140 may select a next resource allocation from the set of resource allocations for users U1-$U_{m+1}$ (block 700). The set of resource allocations may have been determined in block 525. If block 700 is being executed for the first time after a resource request, then the next resource allocation from the set of resource allocations includes the first resource allocation in the set. In subsequent iterations of block 700, the next resource allocation from the set of resource allocations includes the sequentially next resource allocation in the set.

Resource manager 140 may determine if it is permissible to decrease the resource usage of a user's session (block 705). A number of different mechanisms may be used for determining whether it is permissible to decrease the resource usage of the users having existing sessions (e.g., users $U_1$ through $U_m$) and/or to decrease the resource usage of the user ($U_{m+1}$) requesting resources to an amount of resources less than requested by the user. In one embodiment, one of the users having an existing session (e.g., one of users $U_1$ through $U_m$) may be presented with the option to decrease their usage of resources of resource pool 120. For example, referring to FIG. 8, when user $U_{m+1}$ initiates a resource request, a window 800 may be presented to user $U_1$ via, for example, a television 210 coupled to client 110-1. Window 800 may include an offer 810 of a choice of whether user $U_1$ will permit user $U_1$'s existing session to have its resource usage decreased. For example, referring to the exemplary embodiment of FIG. 8, window 800 may include an offer 810 of a choice of whether user $U_1$ will permit the lowering of quality and bandwidth of user $U_1$'s current media stream. As an example, if user $U_1$ is currently receiving a high definition media stream, user $U_1$ may permit the media stream to be lowered in quality to a standard definition media stream, thereby lowering the bandwidth requirements of the media stream.

Figure 8:
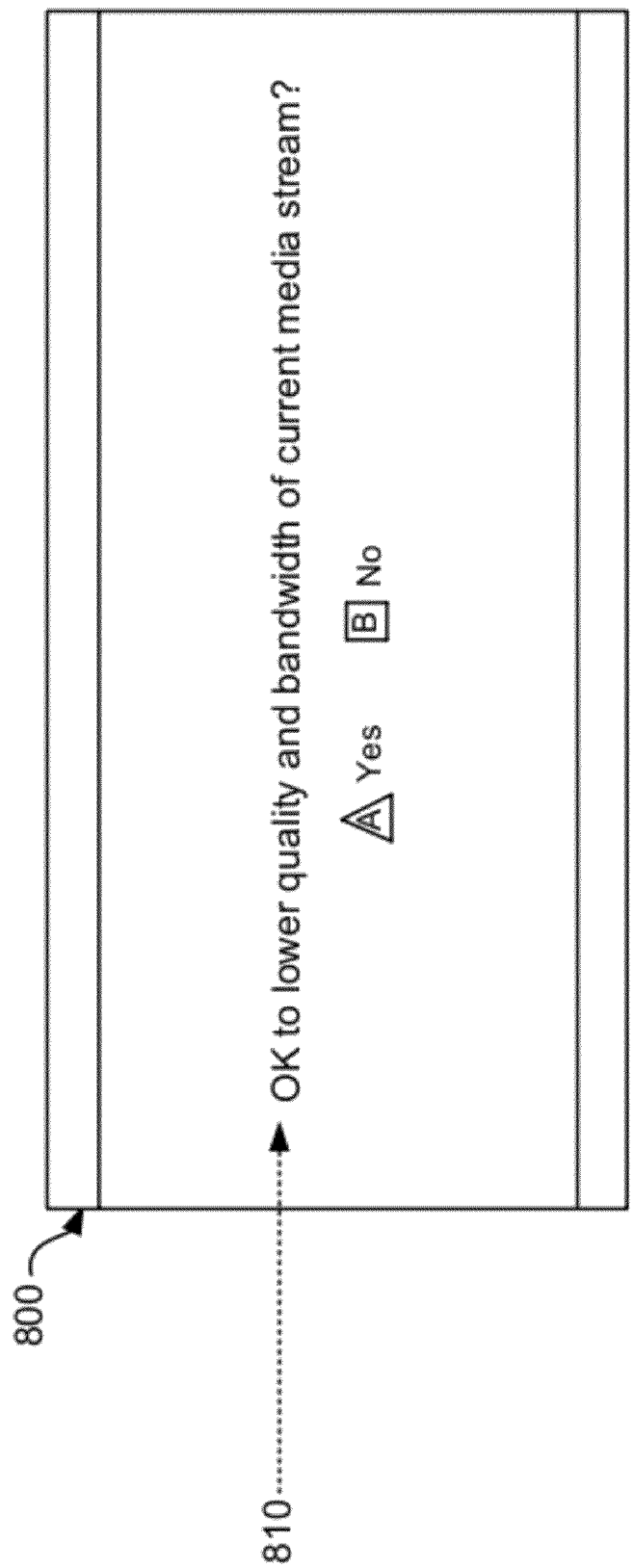
FIG. 8 is a diagram that depicts an exemplary window that may be displayed to a user using resources of a resource pool shared with other users.

In another embodiment, the user requesting resources (e.g., user $U_{m+1}$) may be presented with the option to decrease the requested resources to an amount of resources less than that originally requested. User $U_{m+1}$ may be presented with a window similar to window 800 of FIG. 8, provided, for example, via a television/monitor 210 coupled to client 110-$m$+1, in which user $U_{m+1}$ is given the option to lower the quality and bandwidth of the media stream to be delivered to user $U_{m+1}$. For example, if user $U_{m+1}$ originally requested the delivery of a high definition media stream, user $U_{m+1}$ may be presented with the option to switch to a standard definition media stream that includes the same programming content as the originally requested high definition media stream.

Figure 9:
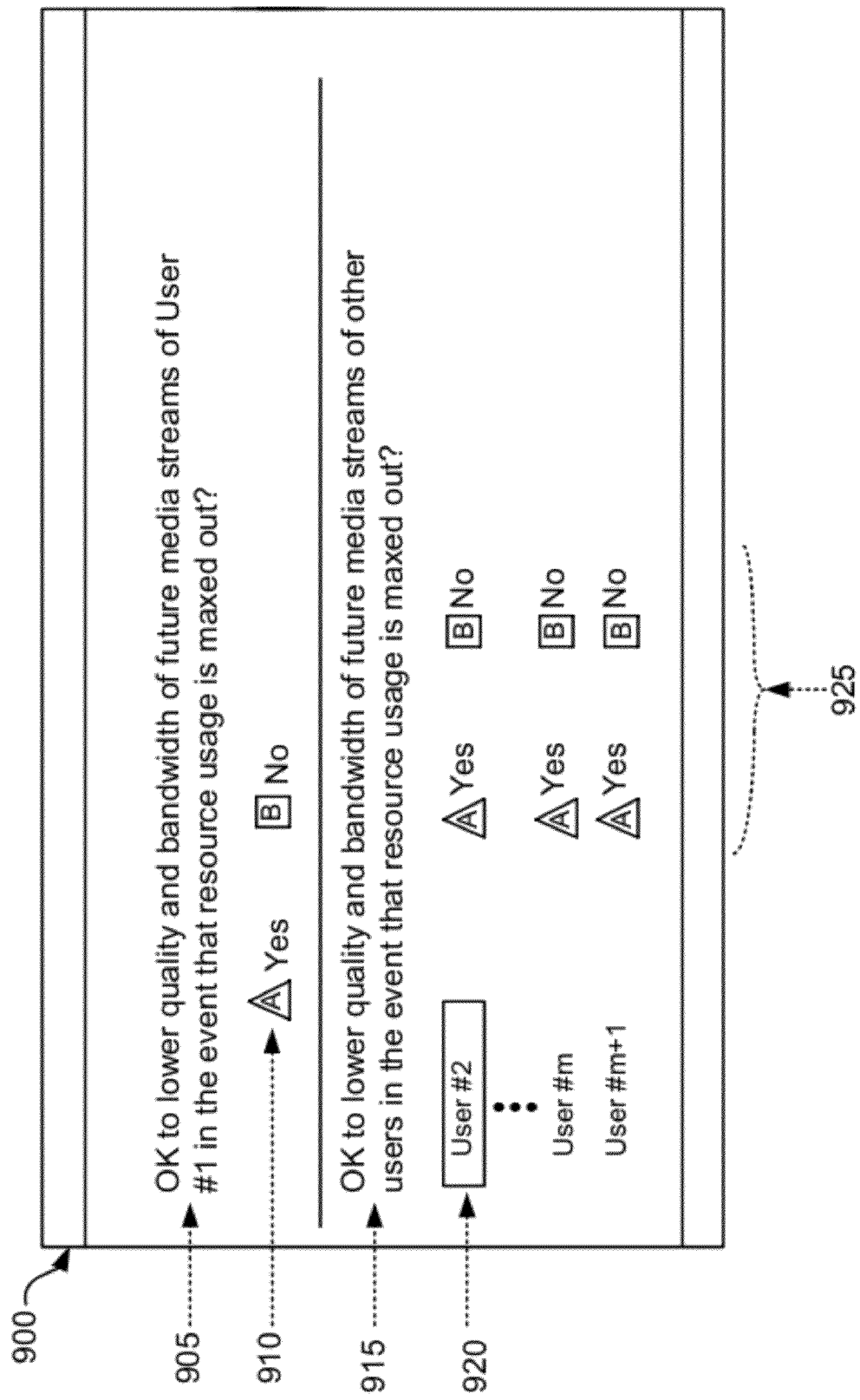
FIG. 9 is a diagram that depicts another exemplary window that may be displayed to a user using resources of a resource pool shared with other users.

In another embodiment, one or more of the users may be considered to have superior "administrative" privileges, and may specify the permissibility of decreasing resource usage for each of the various users in advance (i.e., specifies standing instructions for resolving resource request conflicts with existing sessions). In this embodiment, the determination of whether it is permissible to decrease the resource usage of a user is made automatically, without consulting any user, based on the pre-specified standing instructions of the users having "administrative" privileges. For example, the user (user #1 in this example) having superior "administrative" privileges may access a window 900 (e.g., using a remote control device associated with a STB/client 110), as shown in FIG. 9. Window 900 may present a choice 905 to lower the quality and bandwidth of user #1's future media streams in the event that resource usage has been maxed out (i.e., reached the maximum available bandwidth). The user may select (e.g., via the remote control) either of a "yes" or "no" option 910 in response to the presented choice 905. Additionally, or alternatively, window 900 may present a choice 915 to selectively lower the quality and bandwidth of other users (e.g., users $U_2$ through $U_{m+1}$). The user may select (e.g., via the remote control) one or more users from a list 920 of users and, for each selected user, may select either of a "yes" or "no" option 925. The one or more users having "administrative" privileges may, thus, prescribe in advance what users will or will not have their resource usage automatically decreased in the event that a new resource request causes the resources of resource pool 120 to be maxed out. Though not shown in the window 900 of FIG. 9, the user having "administrative" privileges may additionally have the option to prioritize which users will have their resource usage decreased. For example, the user may specify the order in which users may have their resource usage decreased (e.g., user 3 before user 2, user 4 before user 3, etc.). As another example, the one or more users having administrative privileges may specify a set of users who may have their resource usage decreased simultaneously (e.g., user's 2, 3 and 4).

Referring again to the previous example that applies to the exemplary environment 100 of FIG. 2, user $U_1$, who has an existing high definition video session that uses 18 Mpbs of bandwidth of IP pipe 120, may be presented with a choice of dropping the quality of user $U_1$'s video session down to 4 Mbps (or possibly several other choices, such as 14 Mbps, depending on what types of video streams are available) such that user $U_{m+1}$'s video on demand resource request of 4 Mbps may be granted (i.e., the sum of 4 Mbps and 4 Mbps is less than the maximum bandwidth capacity of IP pipe 120 of 20 Mbps).

If it is not permissible to decrease the resource usage of a user's session (NO—block 705), then resource manager 140 may determine if the resource allocation selected in block 700 is the last resource allocation from the set of resource allocations (block 710). If not (NO—block 710), then the exemplary process may return to block 700 with resource manager 140 selecting a next resource allocation from the set of resource allocations. If the resource allocation selected in block 700 is the last resource allocation from the set of resource allocations (YES—block 710), then the exemplary process may continue at block 530 of FIG. 5B with resource manager 140 sending a resource rejection to user $U_{m+1}$.

Returning to block 705, if it is permissible to decrease the resource usage of a user's session (YES—block 705), then resource manager 140 may negotiate with the user's application to decrease the resource usage for the user's session (block 715). Resource manager 140 may coordinate the decrease in resource usage with one or more applications at the client 110 corresponding to the user whose resources are being decreased. For example, if a user is receiving a high definition video stream (e.g., the user is watching a HD movie), resource manager 140 may not just decrease the quality to standard definition video without first coordinating the change with the application(s) at the client 110 so that client 110 can change the media encoding/decoding to correspond to the different format of the media stream.

If the negotiation is not successful (NO—block 720), then the exemplary process may return to block 700 with resource manager 140 selecting a next resource allocation from the set of resource allocations. If the negotiation is successful (YES—block 720), then resource manager 140 may determine the actual resource usage of the negotiated, decreased resource usage (block 725). Subsequent to block 725, the exemplary process may continue at block 540 of FIG. 5B.

Referring back to FIG. 5B, resource manager 140 may determine if it is able to free sufficient resources to grant user $U_{m+1}$'s request (block 545). Resource manager 140 may determine if it is able to free sufficient resources to grant user Um+1's resource request based on the actual resource usage determined in block 725. For example, the actual resource usage determined in block 725 must decrease the resource usage such that sum of the amount of resources used for the existing sessions plus the amount of resources requested by user Um+1 is equal to or less than the maximum capacity of resource pool 120.

If resource manager 140 is able to free sufficient resources (YES—block 545), then resource manager 140 may send a resource grant to user $U_{m+1}$ (block 550). Referring to the messaging diagram of FIG. 6, resource manager 140 returns a resource grant 625 to user Um+1 via client 110 such that client 110 can receive a media stream via resource pool 120.

Figure 10:
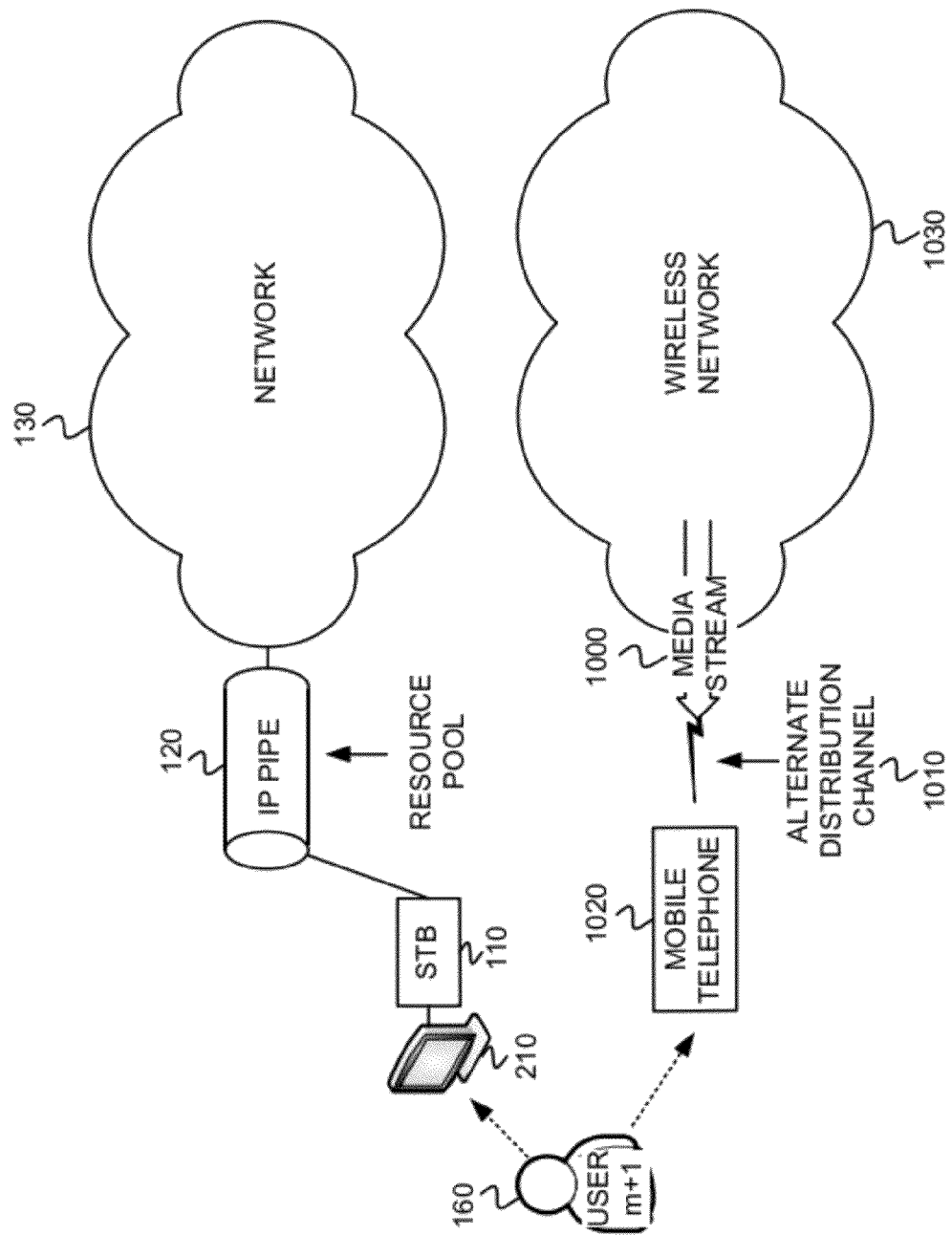
FIG. 10 is a diagram that depicts an example of an alternate distribution channel for delivering a media stream to a user.
Figure 11:
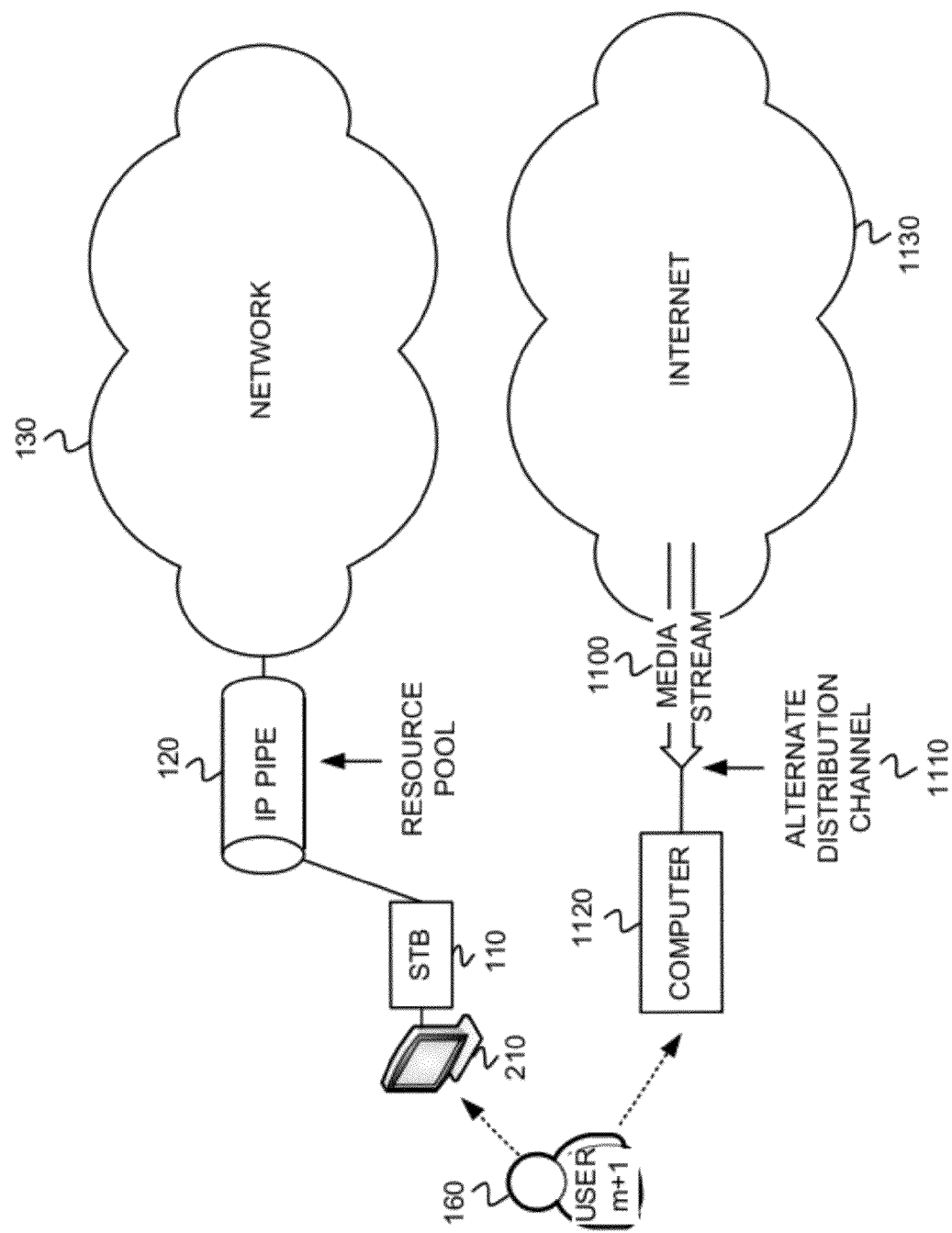
FIG. 11 is a diagram that depicts an example of another alternate distribution channel for delivering a media stream to a user.

If resource manager 140 is not able to free sufficient resources (NO—block 545), then two different options may be selected for implementation by resource manager 140. In one option, resource manager 140 may grant the user's resource request via an alternate distribution channel (block 555). FIG. 10 depicts one example of an alternate distribution channel, where the alternate distribution channel includes a wireless channel via a mobile telephone. Instead of delivering a media stream via network 130, IP pipe 120, STB 110 and television 210 to user 160, media stream 1000 may be delivered via wireless network 1030 and wireless alternate distribution channel 1010 to mobile telephone 1020 of user 160. FIG. 11 depicts another example of an alternate distribution channel, where the alternate distribution channel includes a wired channel via the Internet and a computer. Instead of delivering a media stream via network 130, IP pipe 120, STB 110 and television 210 to user 160, media stream 1100 may be delivered via Internet 1130 and wired alternate distribution channel 1110 to computer 1120 of user 160. The use of an alternate distribution channel may be provided as an optional choice by resource manager 140 to the user requesting the resources, an optional choice that the user may accept or decline (e.g., via a remote control).

In another option, resource manager 140 may reschedule and reserve resources for user $U_{m+1}$ for a later time (block 560). For example, resource manager 140 may schedule a download of the requested media stream to a digital video recorder (DVR) for a later time. The DVR may, for example, reside in a STB associated with the requesting user. As another alternative, not shown in FIG. 5B, if resource manager 140 is not able to free sufficient resources to grant user $U_{m+1}$'s resource request, then resource manager 140 may send a resource rejection to user $U_{m+1}$.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A, 5B and 7, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising: permitting a first user to use a first bandwidth of a shared pool of bandwidth for receiving a first media stream, wherein the shared pool of bandwidth comprises a maximum amount of available bandwidth;

receiving a request from a second user to use a second bandwidth of the shared pool of bandwidth for receiving a second media stream;

determining whether it is permissible to decrease the quality of the first media stream or the second media stream to reduce the first bandwidth or the second bandwidth such that the second bandwidth combined with the first bandwidth does not exceed the maximum amount of available bandwidth, wherein determining whether it is permissible to decrease the quality of the first media stream or the second media stream comprises:

a) signaling the first user to determine if the first user approves decreasing the quality of the first media stream, or b) signaling the second user to determine if the second user approves decreasing the quality of the second media stream, decreasing the quality of the first media stream or the second media stream based on the permissibility determination;

determining whether decreasing the quality of the first media stream or the second media stream will decrease the sum of the first bandwidth and the second bandwidth to an amount less than the maximum amount of available bandwidth of the shared pool of bandwidth to produce a first determination; and granting the request from the second user, based on the first determination, via an alternate distribution channel that does not use the shared pool of bandwidth.

2. The method of claim 1, wherein the shared pool of bandwidth comprises at least a portion of bandwidth associated with an Internet Protocol (IP) pipe of a cable network.

3. The method of claim 2, wherein the shared pool of bandwidth comprises shared bandwidth allocated to a broadband network service subscriber.

4. The method of claim 3, wherein the broadband subscriber comprises a residential or commercial subscriber to the broadband network service.

5. The method of claim 1, further comprising:

consulting with a policy server to determine policy rules for sharing bandwidth of the pool of bandwidth, in response to receiving the request from the second user; and determining a set of possible resource allocations for the first user and the second user based on the policy rules.

6. The method of claim 1, wherein the shared pool of bandwidth comprises at least a portion of bandwidth associated with an Internet Protocol (IP) pipe of a cable network allocated to a broadband network service subscriber and where the alternate distribution channel comprises a wireless channel via a wireless network.

7. The method of claim 6, wherein the wireless network comprises a Public Land Mobile Network (PLMN).

8. The method of claim 1, wherein the shared pool of bandwidth comprises at least a portion of bandwidth associated with an Internet Protocol (IP) pipe of a cable network allocated to a broadband network service subscriber and where the alternate distribution channel comprises a connection via the Internet.

9. A device, comprising: a resource pool management module configured to permit a first user to use a first bandwidth of a shared pool of bandwidth for receiving a first media stream, wherein the shared pool of bandwidth comprises a maximum amount of available bandwidth;

a resource request/grant module configured to receive a request from a second user to use a second bandwidth of the shared pool of bandwidth for receiving a second media stream,
wherein the resource pool management module is further configured to:
determine whether it is permissible to decrease the quality of the first media stream or the second media stream to reduce the first bandwidth or the second bandwidth such that the second bandwidth combined with the first bandwidth does not exceed the maximum amount of available bandwidth of the pool of bandwidth,
determine whether decreasing the quality of the first media stream or the second media stream will decrease the sum of the first bandwidth and the second bandwidth to an amount less than the maximum amount of available bandwidth of the shared pool of bandwidth to produce a first determination, and
grant or deny the request from the second user based on the first determination, wherein the request is granted via an alternate distribution channel that does not use the shared pool of bandwidth.

10. The device of claim 9, wherein, when determining whether it is permissible to decrease the quality of the first media stream or the second media stream, the resource pool management module is configured to:
signal the first user to determine if the first user approves decreasing the quality of the first media stream, or
signal the second user to determine if the second user approves decreasing the quality of the second media stream.

11. The device of claim 9, wherein the shared pool of bandwidth comprises at least a portion of bandwidth associated with an Internet Protocol (IP) pipe of a cable network.

12. The device of claim 11, wherein the shared pool of bandwidth comprises shared bandwidth allocated to a broadband network service subscriber.

13. The device of claim 12, wherein the broadband subscriber comprises a residential or commercial subscriber to the broadband network service.

14. The device of claim 9, wherein the resource pool management module is further configured to:
communicate with a policy server to determine policy rules for sharing bandwidth of the pool of bandwidth, in response to receiving the request from the second user; and
determine a set of possible resource allocations for the first user and the second user based on the policy rules.

15. The device of claim 9, wherein the shared pool of bandwidth comprises at least a portion of bandwidth associated with an Internet Protocol (IP) pipe of a cable network allocated to a broadband network service subscriber and where the alternate distribution channel comprises a wireless channel via a wireless network.

16. The device of claim 15, wherein the wireless network comprises a Public Land Mobile Network (PLMN).

17. The device of claim 9, wherein the shared pool of bandwidth comprises at least a portion of bandwidth associated with an Internet Protocol (IP) pipe of a cable network allocated to a broadband network service subscriber and where the alternate distribution channel comprises a connection via the Internet.

18. The device of claim 9, wherein the resource pool management module is further configured to:
reschedule and reserve the second bandwidth for the second user for a later time for receiving the second media stream.

19. A method, comprising: receiving signaling from a user, having administrative privileges, that specifies a set of users who will have their future bandwidth usage decreased in the event that bandwidth usage of a shared pool of bandwidth uses more than the maximum amount of available bandwidth in the shared pool of bandwidth;
permitting a first user to use a first bandwidth of the shared pool of bandwidth for receiving a first media stream;
receiving a request from a second user to use a second bandwidth of the shared pool of bandwidth for receiving a second media stream;
determining whether it is permissible to decrease the quality of the first media stream or the second media stream, to reduce the first bandwidth or the second bandwidth such that the second bandwidth combined with the first bandwidth does not exceed the maximum amount of available bandwidth, based on the whether the first user or the second user are in the set of users specified in the received signaling; and
decreasing the quality of the first media stream or the second media stream based on the permissibility determination:
determining whether decreasing the quality of the first media stream or the second media stream will decrease the sum of the first bandwidth and the second bandwidth to an amount less than the maximum amount of available bandwidth of the shared pool of bandwidth to produce a first determination; and
granting the request from the second user, based on the first determination, via an alternate distribution channel that does not use the shared pool of bandwidth.

20. The method of claim 19, wherein the shared pool of bandwidth comprises at least a portion of bandwidth associated with an Internet Protocol (IP) pipe.

21. The method of claim 19, wherein the shared pool of bandwidth comprises shared bandwidth allocated to a broadband network service subscriber.

* * * * *